(12) United States Patent
Adelsberger et al.

(10) Patent No.: US 10,854,076 B2
(45) Date of Patent: Dec. 1, 2020

(54) METHOD AND SYSTEM FOR COMPUTING PARKING OCCUPANCY

(71) Applicant: PARKBOB GMBH, Vienna (AT)

(72) Inventors: Christian Adelsberger, Vienna (AT); Ivan Kasanicky, Martin (SK); Gerhard Liebmann, Vienna (AT); Nilüfer Cipa, Vienna (AT)

(73) Assignee: PARKBOB GMBH, Vienna (AT)

( * ) Notice: Subject to any disclaimer, the term of this patent is extended or adjusted under 35 U.S.C. 154(b) by 0 days.

(21) Appl. No.: 16/625,058

(22) PCT Filed: Jun. 13, 2018

(86) PCT No.: PCT/EP2018/065722
§ 371 (c)(1),
(2) Date: Dec. 20, 2019

(87) PCT Pub. No.: WO2018/234127
PCT Pub. Date: Dec. 27, 2018

(65) Prior Publication Data
US 2020/0152061 A1 May 14, 2020

(30) Foreign Application Priority Data
Jun. 22, 2017 (EP) ..................... 17177505

(51) Int. Cl.
*G08G 1/14* (2006.01)
*G08G 1/01* (2006.01)
(Continued)

(52) U.S. Cl.
CPC ........... *G08G 1/144* (2013.01); *G08G 1/0112* (2013.01); *G08G 1/0129* (2013.01); *G08G 1/065* (2013.01);
(Continued)

(58) Field of Classification Search
CPC .... G08G 1/144; G08G 1/0112; G08G 1/0129; G08G 1/065; G08G 1/146; G08G 1/147; G08G 1/148; H04W 4/021
See application file for complete search history.

(56) References Cited

U.S. PATENT DOCUMENTS 6,385,539 B1 *  5/2002  Wilson .................. G01C 21/30
                                                340/905
7,936,284 B2    5/2011  Levine
                        (Continued)

FOREIGN PATENT DOCUMENTS

JP      2003005633 A    1/2003
WO      2016174670 A1   11/2016

OTHER PUBLICATIONS

International Search Report dated Sep. 11, 2018 for corresponding International Application No. PCT/EP2018/065722.

*Primary Examiner* — Ryan W Sherwin
(74) *Attorney, Agent, or Firm* — Tarolli, Sundheim, Covell & Tummino LLP

(57) ABSTRACT

The present invention discloses a method and a system for computing street parking occupancy for a street segment. The computation comprises computing a baseline occupancy module (10) for the street segment using at least map data (120) and at least image data (110), computing a continuous time occupancy module (20) for the street segment using at least the baseline occupancy (10) and at least historical data (200), and computing a forecast occupancy module (30) for the street segment using the continuous time occupancy module (20) and at least real-time data (300). The system comprises at least a memory component storing data and a processing component configured to perform the computation of the baseline occupancy.

18 Claims, 7 Drawing Sheets

(51) Int. Cl.
*G08G 1/065* (2006.01)
*H04W 4/021* (2018.01)
(52) U.S. Cl.
CPC ............ *G08G 1/146* (2013.01); *G08G 1/147* (2013.01); *G08G 1/148* (2013.01); *H04W 4/021* (2013.01)

(56) References Cited

U.S. PATENT DOCUMENTS

| | | | |
|---|---|---|---|
| 2014/0350853 A1* | 11/2014 | Proux | G08G 1/096741 |
| | | | 701/533 |
| 2016/0111004 A1 | 4/2016 | Delamas | |
| 2016/0196747 A1 | 7/2016 | Tsyrklevich | |
| 2016/0321926 A1* | 11/2016 | Mayer | G08G 1/143 |
| 2017/0060133 A1* | 3/2017 | Seo | G05D 1/0212 |
| 2018/0301031 A1* | 10/2018 | Naamani | G06T 7/60 |
| 2018/0357900 A1* | 12/2018 | Wang | G06Q 20/127 |

* cited by examiner

METHOD AND SYSTEM FOR COMPUTING PARKING OCCUPANCY

RELATED APPLICATIONS

The present application is a U.S. National Stage application under 35 USC 371 of PCT Application Serial No. PCT/EP2018/065722, filed on 13 Jun. 2018; which claims priority from EP Patent Application No. 17177505.9, filed 22 Jun. 2017, the entirety of both of which are incorporated herein by reference.

FIELD

The invention relates to computing parking occupancy. More specifically, the invention relates to generating parking occupancy for a certain street area based on various historical and real-time inputs.

INTRODUCTION

Looking for parking can be a time consuming and frustrating experience. Particularly in the cities or similar densely populated areas, street parking is often elusive and hard to come by. Often, drivers are even discouraged from going somewhere with a car due to the difficulty of finding parking. Many drivers opt to drive directly to underground or above ground parking lots simply to avoid the additional time spent on looking for a street parking place. However, parking lots can be expensive, in some cities prohibitively so. Furthermore, a driver that has previously spent a lot of time on looking for parking in a certain area in the past, might be hesitant to attempt looking again, and instead opt to drive straight to a parking lot. This might not be necessary, since parking availability can be very different depending on the time, day, or other factors such as nearby events. Therefore, it can be useful to provide a tool that can compute likely parking occupancy at a given day and time at a given place. Several tools aiming to alleviate the present difficulty have been disclosed.

U.S. Pat. No. 7,936,284 discloses a system for parking time estimations, the system comprising at least one device able to sense at least momentary location and respective time; and an application server to receive from a plurality of the devices time series of location points and to calculate, based on the received time series of location points, duration of searches for parking spots. The invention provides a method for parking time estimations, the method comprising detecting beginning of searching for a parking spot by a user of a device able to sense at least momentary location and respective time; detecting time of parking; and calculating at least estimated duration of searching for a parking spot.

US patent application 2016/0196747 discloses a system and method for locating parking spaces. A user can enter the desired location for parking and the application will transmit the information to a parking information database server. The server will return the location of parking spaces and probability of space availability. In addition, the database includes detailed parking information to include price, hours, and any special restrictions. These results can be depicted as a list or graphically displayed on a street map, satellite map or hybrid map views. Filters can be applied to find a specific type of parking available. The application provides real-time availability information in areas where the infrastructure to generate such data is available via sources such as on-street sensors or parking lot barrier systems. The system uses various secondary information to adjust historical observations of space availability in order to make provide accurate space predictions.

The tools presently available often only take into account one or two sources of parking availability information. Therefore, they may return inaccurate or misleading results. It is therefore the aim of the present invention to overcome the shortcomings of the prior art and to present an improved method and a system for computing parking occupancy.

SUMMARY

The present invention is specified in the claims as well as in the below description. Preferred embodiments are particularly specified in the dependent claims and the description of various embodiments.

In a first aspect, the invention discloses a method for computing street parking occupancy for a street segment. The method comprises computing a baseline occupancy module for the street segment using at least map data and at least image data. The method also comprises computing a continuous time occupancy module for the street segment using at least the baseline occupancy and at least historical data. The method further comprises computing a forecast occupancy module for the street segment using the continuous time occupancy module and at least real-time data.

The street segment can comprise a part of a street, a whole street, or a plurality of streets. The street segment can refer herein to a neighborhood comprising several streets, or it can refer to a section of one street. If the image data used comprises ground-based pictures, "street segment" can refer to the visible part of one street. If aerial pictures are used, "street segment" can refer to a plurality of streets or streets segment visible from above.

The invention provides an improved and efficient way of calculating street parking occupancy. In other words, the amount of free parking spaces vs the amount of occupied parking spaces can be calculated by using the various modules described in the present document. Module can refer herein to an algorithm or a section of an algorithm that deals with a specific task. Module can also refer to a self-contained set of instructions taking certain data as an input and outputting certain other data.

Note, that the parking occupancy for a plurality of street segments can be combined to obtain the parking occupancy of a larger area, such as a whole city, a municipality, a larger neighborhood or another area of interest.

The invention can be used, for example, by drivers that are looking for parking in a certain area. Since looking for a parking space often takes a lot of time, it can be particularly useful to know in advance whether a certain area has available street parking or not.

The baseline occupancy module can refer to the module that relates to computing the general average parking occupancy of a street segment.

In some embodiments, the baseline occupancy module computation can comprise using image data to compute a car recognition module. That is, the car recognition module can be a sub-module of the baseline occupancy module. In other words, one part of the baseline occupancy module computation can be the computation of the car recognition module which takes image data as an input. The image data can comprise air and/or ground based images or videos. Those can be taken by satellites, drones, dashboard cameras, smartphones, street cameras or other devices. The images can also be preprocessed before serving as inputs for the car recognition module.

In some embodiments, the car recognition module can output a plurality of georeferenced features corresponding to cars detected in image data. That is, the car recognition module can serve to detect cars or other vehicles in the image data. The car recognition module is particularly useful, since it allows for isolating the features relating to vehicles from the images that have many other features. The georeferenced features can comprise, for example, polygons with additional attributes such as orientation, car center or potentially other attributes. They can be output in a GeoJSON format which allows for encoding of addresses, locations and geographical features.

In some embodiments, the baseline occupancy module computation can comprise using map data to compute a center line module. That is, the center line module can also comprise a sub module of the baseline occupancy module. In other words, as part of the baseline occupancy module computation, the map data can be used to compute the center line module. Put simply, the center line module is configured to detect the middle of the streets present in the street segment (as mentioned above, the street segment can refer to a part of a street, or a plurality of parts of streets such as a neighborhood). The map data can comprise data relating to a specific layout of the street segment, or of a larger area. This data can come from open source maps such as Open Street Map, or from commercial companies such as Google, Yandex, HERE and others.

In some embodiments, the center line module can output at least georeferenced oriented features corresponding to the middle of the street segment. That is, the center line module can output a line or a collection of lines or a collection of points corresponding to an estimate of the middle of a street or street segment. This can be particularly advantageous, since being able to determine which side of the street a car is parked on or if it is parked at all can be particularly important to determine the parking occupancy of a street segment. For example, the center line module can be used to distinguish between moving cars and parked cars based on their distance from the center line.

In some embodiments, the baseline occupancy module computation can comprise using the outputs of the car recognition module and the center line module to compute a parked car identification module. That is, in embodiments where both the car recognition module and the center line module are present, their outputs can be combined to determine which cars are parked and which are moving or waiting at a street light and/or at an intersection and/or parked in private parking places.

In some such embodiments, the parked car identification module can filter out at least one of cars that are moving, cars that are parked on private property, cars that are parked on private parking lots. Preferably, all of the listed types of cars can be filtered. The filtering done by the parked car identification module can be particularly advantageous, since when looking for a parking space, many drivers would rather avoid private parking spaces and rather look for available public street parking.

In some embodiments, the parked car identification module can use at least a combination of Geographic Information System and spatial statistical techniques. For example, the parked car identification module can use the GIS data to map a certain object to a certain part of the street and infer that it is likely a parked car. In another example, the parked car id module can statistically estimate whether a detected object is likely to be a car based on its shape, position on a street and/or other features.

In some embodiments, the parked car identification module can output a plurality of georeferenced features corresponding to cars. Each feature corresponding to a car can further comprise a probability that the car is parked. This can be advantageous, since the parked car identification module can use statistical techniques to filter out the parked cars, and there can be a certain uncertainty associated with such statistical techniques. However, this can also make the parked car id module more flexible, since even in the absence of perfect or exhaustive data, it can output the probability that a certain car is parked. This can be preferably to outputting no result at all.

In some embodiments, the baseline occupancy module computation can comprise using at least two of map data, image data, and the output of the center line module to compute a section capacity module. Put simply, the section capacity module can refer to the overall parking space availability in the street segment in question. To obtain this overall availability, a plurality of inputs can be used, since computing it on the basis of a single source of input can yield large uncertainties.

In some embodiments, the section capacity module can output at least a number of cars that can park in the street segment with a lower and upper bounds of said number. That is, the section capacity module can output the most likely number of parked cars based on the available data, but include the uncertainty of that result as upper and lower bounds. This can be used to give the user a "best-case scenario" and a "worst-case scenario" of parking availability and help with the decision on where to look for parking.

In some embodiments, the baseline occupancy module computation can output at least an estimate for the percentage of available parking spots for the street segment and an error rate of the estimate with its distribution. That is, the computation of the baseline occupancy module can yield parking occupancy for a given street segment based on all the input data such as image data and map data. Preferably, the output of the baseline occupancy module is given after computing the various submodules described above. The baseline occupancy module is a robust algorithm that can output a prediction of parking occupancy and the error rate of such a prediction.

In some preferred embodiments, the baseline occupancy module computation can output parking availability on the street segment at a given time. That is, the baseline occupancy module output can depend on the time (and/or date) associated with the image and/or map data (for example, the time of day and the day of the week on which the satellite images were taken). The baseline occupancy module yields a relatively high precision of parking occupancy, but at a certain time only. In some such embodiments, a plurality of baseline occupancies for different times can be computed for the street segment. This is particularly advantageous, since having a plurality of baseline occupancies can allow to extrapolate between the times for which they are computed, to obtain estimated baseline occupancies for any given time (and/or date).

In some embodiments, the historical data used to compute the continuous occupancy module can comprise at least one of historical movement data and historical event data.

In some such embodiments, the historical movement data can comprise at least one of floating car data, tracking data from navigation service providers and mobile network data. The floating car data or floating cellular data can relate to data originating from mobile devices (such as mobile phones, tablets, wearable devices and other similar devices with network connectivity capabilities). The floating car data can be collected from users using the present invention as a parking assistance application, from partners, and also from other mobile device users. The tracking data from navigation service providers can refer to data collected by on-board GPS devices or similar devices. The mobile network data can refer to data originating from SIM cards or similar connectivity components on mobile phones communicating with the network providers (for example, this can comprise data relating to a SIM card connecting to a plurality of cell phone towers due to the owner moving around in a car).

In some such embodiments, the historical event data can comprise at least one of parking assistance application data, parking payment providers' data, parking management system data, and car sharing companies' data. The parking assistance application data can comprise data collected by various mobile device applications that are aimed to assist users with finding parking spots. For example, the present invention can be used as such an application. The parking payment providers' data can comprise data collected by applications, systems or other means of allowing the users to pay for a parking spot (for example, some cities or municipalities sell stickers that allow the user to park anywhere within the city or municipality, provided it is not a private parking spot or that other rules forbid it). The parking management system data can comprise data coming from parking meters or similar devices. The car sharing companies' data can comprise data collected by companies such as DriveNow, car2go, or similar ventures.

In some embodiments, the continuous time occupancy module computation can further comprise using historical data to compute parking event identification module. That is, the parking event identification module can be computed as a submodule of the continuous time occupancy module. The parking event identification module can refer to detecting that a car has parked or has left a parking space. In some such embodiments, the parking event identification module can output a plurality of park-in and park-out events on the street segment. In other words, the parking event id submodule can be configured to detect a car entering or leaving a parking spot based on the historical data available for the street segment.

In some embodiments, the continuous time occupancy module can take into account at least one of the following variable types: location and vicinity characteristics, time and date, and number of parking events in the recent history. That is, the continuous time occupancy module can advantageously process data relating to location, time and/or parking events to produce an accurate parking occupancy for a street segment at any time.

In some embodiments, the continuous time occupancy module can use at least one of statistical filtering methods and spatial point processes to compute its output. For example, the Kalman filter can be used to accurately compute parking occupancy as part of the continuous time occupancy module. Using such statistical tools is particularly advantageous, since the historical data available may be noisy, incomplete, and/or have certain error rates associated with it. Therefore, processing it with statistical means taking into account such uncertainties can improve the accuracy of the output and ensure a robust result.

In some embodiments, the continuous time occupancy module can output a model that provides a measure of parking availability for a given street segment and time. In other words, the continuous time occupancy module can output a likely distribution of parking availability or occupancy at any time on a given street segment. Note, that the location of the specific street segment in question can also be accounted for. For example, street segments located in the vicinity of major transportation hubs such as train stations would likely have a higher parking occupancy on average than street segments located on quiet streets in the suburbs.

In some embodiments, the output of the continuous time occupancy module can be presented as at least one of at least one heatmap, values of availability or occupancy for a predefined location and time, values of a selected quantile of current occupancy, and predefined occupancy categories. That is, the output of the continuous time occupancy module can be presented to a user (for example, when the invention is used as part of a parking assistance app) in different formats depending on user preference or on convenience. The heatmap can comprise an image with areas comprising different parking occupancy being shown in different colours or different shades. For example, areas with lower parking occupancy (that is, with higher parking availability) can be represented as green, and areas with higher parking occupancy (that is, with lower parking availability) can be represented as red. The values of availability or occupancy can just comprise an estimate such as, for example, "100 parking places available in your selected area of interest". The values of quantiles can comprise outputs such as "40% to 60% of parking spots in your area of interest are occupied", or a warning, such as "over 90% of parking spots in your area of interest are occupied". The occupancy categories can refer to sorting the parking occupancy into categories such as "low occupancy", "moderate occupancy" and "high occupancy" for a more intuitive experience for the user.

In some embodiments, real-time data used to compute the forecast occupancy module can comprise at least one of real-time movement data and real-time event data. The real-time movement data and real-time event data can be analogous to the historical movement data and historical event data respectively. Therefore, the description relating to the historical data above can also be applied for the case of real-time data.

In some preferred embodiments, the real-time movement data can comprise at least one of floating car data, tracking data from navigation service providers, traffic monitoring systems data and mobile network data. In some preferred embodiments, the real-time event data can comprise at least one of parking assistance application data, parking payment providers' data, parking management system data, and car sharing companies' data. These types of data can be as described above, with the difference being that the real-time data preferably comprises data obtained right before or at the time of computing the parking occupancy.

In some embodiments, the forecast occupancy module can output predicted availability of parking spaces in the street segment at a future time. The forecast occupancy module output can be directly combined with the continuous occupancy output to obtain a parking occupancy forecast for the present, or the near future. Therefore, the forecast occupancy module can adjust the output of the continuous occupancy module, be it a heatmap, predefined occupancy categories, or another type of output. This module can be particularly advantageous for users that are hesitating about taking the car or public transport to a certain destination: knowing the likely future parking occupancy, they can come to the decision better informed. Indeed, as part of the output of the forecast occupancy module, the present invention can also suggest to the users the best time to find parking in a given area. This can be particularly useful if users are flexible about going to a certain place, and would like to pick a time when they would be most likely to readily find parking.

In some embodiments, the method can further comprise computing a readjustment module using at least new data. That is, if new data becomes available at some point, the parking occupancy can be recalculated with the new data taken into account. The readjustment module can process the new data to determine what kinds of changes would be necessary.

In some such embodiments, the output of the readjustment module can be used as a further input into the continuous time occupancy module. That is, the continuous occupancy module can take into account the new data preprocessed by the readjustment module to adjust the result.

In some such embodiments, the new data can comprise at least one of new image data and new map data. For example, new map data can include details on street closures due to construction work. The new image data can comprise newer satellite images.

In a second aspect, the invention discloses a system for computing street parking occupancy for a street segment. The system comprises a server. The server comprises a memory component configured to store at least image data, map data and historical data. The server further comprises a processing component. The processing component is configured to compute a baseline occupancy module for the street segment using at least map data and at least image data. The processing component is further configured to compute a continuous time occupancy module for the street segment using at least the baseline occupancy and at least historical data. The processing component is also configured to compute a forecast occupancy module for the street segment using the continuous time occupancy and at least real-time data.

In some embodiments, the system can further comprise a mobile device. The mobile device can comprise a mobile phone, a tablet, a personal computer, a wearable device or a similar mobile device configured for network connectivity.

In some such embodiments, the mobile device can be configured to communicate with the server. That is, the mobile device can be configured to exchange data with the server.

In some embodiments, the mobile device can be configured to send requests for parking occupancy to the server and the server can be configured to return the output of the forecast occupancy module. In other words, the user of the mobile device may wish to know the parking occupancy of a certain area of interest (or a street segment). The user may prompt the server to calculate or return the parking occupancy of such area of interest, thereby sending a request via the mobile device. The server can then return the parking occupancy, which can be displayed on the user's mobile device in different ways (such as a heatmap, number of free parking spots, predefined parking occupancy categories etc.). This can be particularly convenient for the user, as they can get an estimate of the area's parking occupancy before starting to look for parking there, or obtain an estimate of the time necessary to find parking.

In some embodiments, the mobile device can further comprise a graphical display and the server can be configured to send a graphical representation of parking availability obtained by the forecast occupancy module to the mobile device's graphical display. As mentioned above, the user may benefit from such a convenient and accurate way of estimating the parking occupancy. In some such embodiments, the graphical representation can comprise a heatmap. This can provide the user with an intuitive way of understanding the parking occupancy.

In some embodiments, the server can be configured to send updates to the mobile device when the output of the forecast occupancy module changes. For example, if the user is on the way an area of interest where they would like to park, the server can send an alert if the parking occupancy at this area of interest exceeds 90%. Additionally or alternatively, the server can send an update is the parking occupancy increases or increases with respect to the distribution first returned to the user's mobile device.

In some embodiments, the mobile device can be configured to send the server data relating to parking events. That is, if the user enters or leaves a parking spot, the mobile device can communicate this information to the server. This can be particularly advantageous to keep track of real-time park-in and park-out events, and contribute to a better overall user experience.

In some such embodiments, the server can be configured to process the data sent by the mobile device and to incorporate it into at least one of historical data and real-time data. In some such embodiments, the server can be configured to update the output of at least one of the continuous time occupancy module and the forecast occupancy module based on the data sent by the mobile device. That is, this data can be used to adjust the parking occupancy estimates sent to other users looking for parking or wishing to know the parking occupancy in a certain area of interest.

The present invention is also defined by the following numbered embodiments.

Below is a list of method embodiments. Those will be indicated with a letter "M". Whenever such embodiments are referred to, this will be done by referring to "M" embodiments.

M1. A method for computing street parking occupancy for a street segment, the method comprising a. Compute a baseline occupancy module (10) for the street segment using at least map data (120) and at least image data (110); and b. Compute a continuous time occupancy module (20) for the street segment using at least the baseline occupancy (10) and at least historical data (200); and c. Compute a forecast occupancy module (30) for the street segment using the continuous time occupancy module (20) and at least real-time data (300).

Embodiments relating to baseline occupancy module (10).

M2. A method according to the preceding embodiment wherein the baseline occupancy module (10) computation comprises using image data (110) to compute a car recognition module (130).

M3. A method according to the preceding embodiment wherein the car recognition module (130) outputs a plurality of georeferenced features corresponding to cars detected in image data (110).

M4. A method according to any of the preceding embodiments wherein the baseline occupancy module (10) computation comprises using map data (120) to compute a center line module (140).

M5. A method according to the preceding embodiment wherein the center line module (140) outputs at least georeferenced oriented features corresponding to the middle of the street segment.

M6. A method according to any of the preceding embodiments and with the features of embodiments M2 and M4 wherein the baseline occupancy module (10) computation comprises using the outputs of the car recognition module (130) and the center line module (140) to compute a parked car identification module (150).

M7. A method according to the preceding embodiment wherein the parked car identification module (150) filters out at least one of
 cars that are moving; and
 cars that are parked on private property; and
 cars that are parked on private parking lots.

M8. A method according to any of the preceding embodiments and with the features of embodiment M6 wherein the parked car identification module (150) uses at least a combination of Geographic Information System and spatial statistical techniques M9. A method according to any of the preceding embodiments and with the features of embodiment M6 wherein the parked car identification module (150) outputs a plurality of georeferenced features corresponding to cars and wherein each feature corresponding to a car further comprises a probability that the car is parked.

M10. A method according to any of the preceding embodiments and with the features of embodiment M4 wherein the baseline occupancy module (10) computation comprises using at least two of
 map data (120); and
 image data (110); and
 the output of the center line module (140)
to compute a section capacity module (160).

M11. A method according to the preceding embodiment wherein the section capacity module (160) outputs at least a number of cars that can park in the street segment with a lower and upper bounds of said number.

M12. A method according to any of the preceding embodiments wherein the baseline occupancy module (10) computation outputs at least an estimate for the percentage of available parking spots for the street segment and an error rate of the estimate with its distribution.

M13. A method according to any of the preceding embodiments wherein the baseline occupancy module (10) computation outputs parking availability on the street segment at a given time.

M14. A method according to the preceding embodiment wherein a plurality of baseline occupancies (10) for different times are computed for the street segment.

Embodiments relating to continuous time occupancy module (20).

M15. A method according to any of the preceding embodiments wherein the historical data (200) comprises at least one of
 historical movement data (210); and
 historical event data (220).

M16. A method according to the preceding embodiment wherein the historical movement data (210) comprises at least one of
 floating car data; and
 tracking data from navigation service providers; and
 mobile network data.

M17. A method according to any of the preceding embodiments and with the features of embodiment M15 wherein the historical event data (220) comprises at least one of
 parking assistance application data; and
 parking payment providers' data; and
 parking management system data; and
 car sharing companies' data.

M18. A method according to any of the preceding embodiments wherein the continuous time occupancy module (20) computation further comprises using historical data (200) to compute parking event identification module (230).

M19. A method according to the preceding embodiment wherein the parking event identification module (230) outputs a plurality of park-in and park-out events on the street segment.

M20. A method according to any of the preceding embodiments wherein the continuous time occupancy module (20) takes into account at least one of the following variable types
 location and vicinity characteristics; and
 time and date; and
 number of parking events in the recent history.

M21. A method according to any of the preceding embodiments wherein the continuous time occupancy module (20) uses at least one of
 statistical filtering methods; and
 spatial point processes
to compute its output.

M22. A method according to any of the preceding embodiments wherein the continuous time occupancy module (20) outputs a model that provides a measure of parking availability for a given street segment and time.

M23. A method according to any of the preceding embodiments wherein the output of the continuous time occupancy module (20) is presented as at least one of
 at least one heatmap; and
 values of availability or occupancy for a predefined location and time; and
 values of a selected quantile of current occupancy; and
 predefined occupancy groups.

Embodiments relating to forecast occupancy module (30).

M24. A method according to any of the preceding embodiments wherein real-time data (300) comprises at least one of
 real-time movement data (310); and
 real-time event data (320).

M25. A method according to the preceding embodiment wherein the real-time movement data (310) comprises at least one of
 floating car data; and
 tracking data from navigation service providers; and
 traffic monitoring systems data; and
 mobile network data.

M26. A method according to any of the preceding embodiments and with the features of embodiment M24 wherein the real-time event data (320) comprises at least one of
 parking assistance application data; and
 parking payment providers' data; and
 parking management system data; and
 car sharing companies' data.

M27. A method according to any of the preceding embodiments wherein the forecast occupancy module (30) outputs predicted availability of parking spaces in the street segment at a future time.

Embodiments relating to readjustment module (40).

M28. A method according to any of the preceding embodiments further comprising computing a readjustment module (40) using at least new data (400).

M29. A method according to the preceding embodiment wherein the output of the readjustment module (40) is used as a further input into the continuous time occupancy module (20).

M30. A method according to any of the preceding embodiments and with the features of embodiment M28 wherein the new data (400) comprises at least one of new image data (410); and new map data (420).

Below is a list of system embodiments. Those will be indicated with a letter "S". Whenever such embodiments are referred to, this will be done by referring to "S" embodiments.

S1. A system for computing street parking occupancy for a street segment, the system comprising a server comprising a memory component configured to store at least image data (110), map data (120) and historical data (200); and a processing component configured to a. Compute a baseline occupancy module (10) for the street segment using at least map data (120) and at least image data (110); and b. Compute a continuous time occupancy module (20) for the street segment using at least the baseline occupancy (10) and at least historical data (200); and c. Compute a forecast occupancy module (30) for the street segment using the continuous time occupancy (20) and at least real-time data (300).

Embodiments relating to a combination of a server and a mobile device.

S2. A system according to the preceding embodiment further comprising a mobile device.

S3. A system according to the preceding embodiment wherein the mobile device is configured to communicate with the server.

S4. A system according to the preceding embodiment wherein the mobile device is configured to send requests for parking occupancy to the server and the server is configured to return the output of the forecast occupancy module (30).

S5. A system according to any of the preceding embodiments and with the features of embodiment S3 wherein the mobile device further comprises a graphical display and wherein the server is configured to send a graphical representation of parking availability obtained by the forecast occupancy module (30) to the mobile device's graphical display.

S6. A system according to the preceding embodiment wherein the graphical representation comprises a heatmap.

S7. A system according to any of the preceding embodiments and with the features of embodiment S4 wherein the server is configured to send updates to the mobile device when the output of the forecast occupancy module (30) changes.

S8. A system according to any of the preceding embodiments and with the features of embodiment S3 wherein the mobile device is configured to send the server data relating to parking events.

S9. A system according to the preceding embodiment wherein the server is configured to process the data sent by the mobile device and to incorporate it into at least one of historical data (200); and real-time data (300).

S10. A system according to the preceding embodiment wherein the server is configured to update the output of at least one of the continuous time occupancy module (20) and the forecast occupancy module (30) based on the data sent by the mobile device.

The present technology will now be discussed with reference to the accompanying drawings.

DESCRIPTION OF EMBODIMENTS

Figure 1:
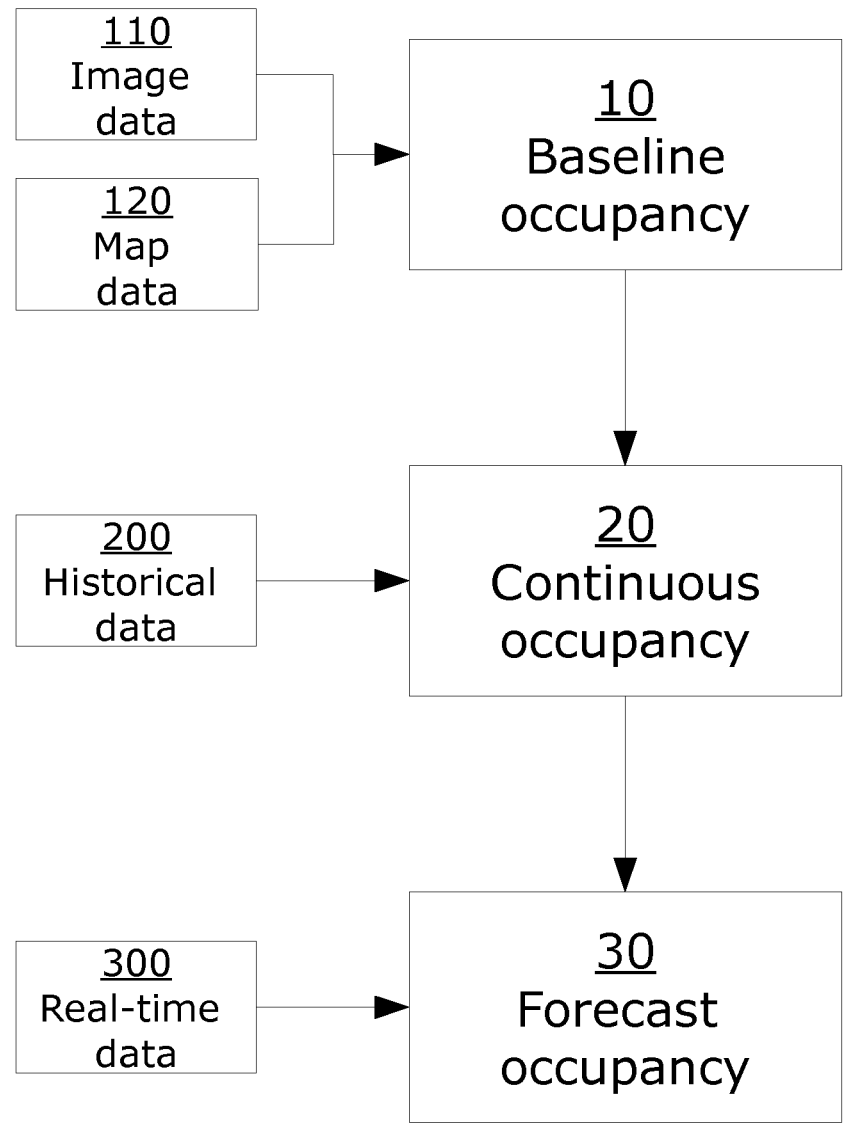
FIG. 1 depicts a schematic embodiment of a method for computing parking occupancy according to one aspect of the invention.

FIG. 1 depicts an embodiment of a method for computing parking occupancy. The method can be used to obtain parking occupancy on a street segment at various times of the day, working vs non-working days, taking into account parking rules, and under other varying conditions. By combining the parking occupancy in various street segments, the parking occupancy of a region, a neighbourhood or a city can be obtained. The parking occupancy can then be conveyed to the persons that may desire to park in the area, such as drivers. For example, the parking occupancy can be shared via an application (app) or a program for a mobile personal device such as a cellphone or a tablet. Additionally or alternatively, the information can be shared with other interested parties using a defined application programming interface (API). The information delivered to each driver can also be personalized. For example, the driver might have a certain profile associated with them. The driver may have a special parking permit (such as a resident person, a disability permit, an employee permit or other forms of permits). The parking information conveyed to the driver can take the driver's profile into account. In the embodiment where the parking occupancy is delivered via an app, the driver's profile can preferably be set up and updated in the app directly, or via a web interface, or via other means.

The invention describes a way to compute parking occupancy or availability by using a plurality of modules. Each such module can comprise a sub routine or an algorithm that takes certain inputs and provides certain outputs.

As depicted in FIG. 1, baseline occupancy 10 is first computed. The baseline occupancy 10 refers to the parking occupancy of a street segment or another region in question at a particular day and/or time of day. That is, the baseline occupancy 10 reflects how busy a certain area is at a given time in terms of parking space availability. To obtain the baseline occupancy 10, image data 110 and map data 120 are processed and transformed via certain sub-routines or modules. That is, the inputs of the baseline occupancy 10 are at least image data 110 and map data 120. This is described in more detail in the description relating to FIG. 4. The outputs of the baseline occupancy 10 can comprise a percentage of free spots in each street section, an error rate, and a distribution of the error rate of the estimate.

Image data 110 can comprise satellite images, aerial images, and/or ground-based images. Multiple sources of image data 110 can be used to obtain more accurate results. Preferably, high resolution satellite or aerial images with a resolution below 50 cm are used. Image data 110 can be obtained from open sources, commercial sources or private sources. For example, satellite imagery from government sources can be used. In another example, cameras used in smart cars, street cameras or smartphone cameras can be used to obtain ground-based images. Image data 110 also comprises at least a time stamp and location information. That can be particularly useful for computing the baseline occupancy 10. Since the baseline occupancy 10 represents parking availability at a given time of day or day and at certain locations, image data 110 taken at different times and, preferably, days, can be used to obtain a plurality of baseline occupancies 10, each corresponding to the time given by the image data's timestamp.

Map data 120 can comprise existing city maps. For example, this can include open street map (OSM), open government data (OGD), data provided by a commercial company or other map data. Map data 120 can comprise information relating to streets, particularly car roads where parking can be possible. Map data 120 can also comprise accurately depicted proportions and a scale of city elements. Map data 120 can also comprise a time stamp. This can be particularly useful when generating parking occupancy of a neighbourhood or city with a lot of temporary changes such as construction.

The baseline occupancy 10 or its output can then be combined with historical data 200 to obtain continuous time occupancy 20. Put differently, the inputs of the continuous time occupancy 20 module can include the baseline occupancy 10 (preferably a plurality of baseline occupancies 10) and historical data 200. The continuous time occupancy 20 refers to parking availability for a given location and time. That is, the continuous time occupancy 20 can comprise a model giving the likely availability of parking at any time on any day and any place. This model can be statistical or machine learning-based. The continuous time occupancy 20 can comprise a combination of the baseline occupancy 10 at different times, with an interpolation for the time for which no baseline occupancy is available. The variables that can be included into the continuous time occupancy 20 module can comprise location and vicinity characteristics, time and date and their properties (for example a working day vs a weekend day) and historical data 200 variables. The continuous time occupancy 20 can be computed by using at least one or a combination of a Kalman filter, a particle filter, ensemble filtering methods, spatial point processes, or other similar statistical tools.

The output of the continuous time occupancy 20 module can comprise the distribution of parking occupancy at a given time and in a specific location. This output can be presented to the user (such as a user of an app) in various forms, such as one or more heatmaps of parking availability or occupancy, values of availability or occupancy for a predefined location and time, values of a selected quantile of current occupancy (for example, the result can be given as a statement such as "40% to 60% of all parking spaces in your selected area are occupied" and/or as a warning such as "over 90% of parking spaces in your selected area are occupied"), predefined categories (for example low, moderate or high parking availability), or in the form of other outputs.

Note, that heatmap can refer herein to a graphical representation corresponding to parking availability at a certain location, street segment or neighborhood at a certain point in time. The heatmap can comprise areas of different shades or different colours to indicate high and low occupancy.

The historical data 200 can comprise data relating to parking events that occurred on the street segment in question in the past. It can also include data or information relating to the movement of people and vehicles around the street segment in the past. This is further discussed in the description relating to FIG. 3.

The continuous time occupancy 20 or its output can be combined with real-time data 300 to obtain forecast occupancy 30. The forecast occupancy 30 refers to the parking occupancy or availability at a future time or date. In other words, the forecast occupancy 30 module can take as inputs the continuous time occupancy 20 or its output and the real-time data 300 referring to current parking-related events, and output a predicted occupancy or availability of parking at a specific place and time. The output of the forecast occupancy 30 can be similar to the output of the continuous time occupancy 20. That is, it can comprise heatmaps, values of parking availability or similar outputs.

The real-time data 300 can comprise data relating to real-time parking events. It can also include data or information relating to real-time movement of people and vehicles around the street segment in question. The real-time data 300 is discussed in further detail in the description relating to FIG. 3.

Figure 2:
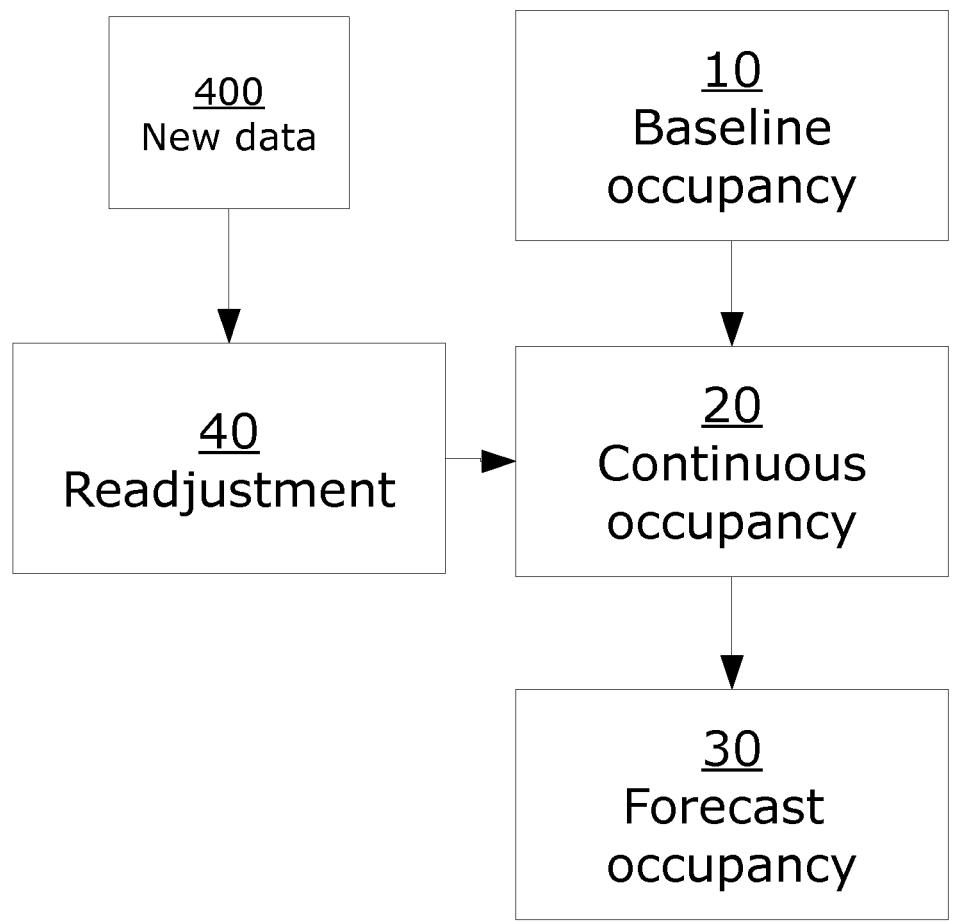
FIG. 2 depicts a schematic variation of a method for computing parking occupancy according to one aspect of the invention.

FIG. 2 schematically depicts an optional addition to the method for computing parking occupancy. As before, the baseline occupancy 10 is first computed and used to obtain the continuous time occupancy 20. However, an optional readjustment module 40 is also computed. The readjustment 40 can be computed by using an input of new data 400. The readjustment module 40 can be activated when new data 400 such as new images, or new map data is available. New map data can be used when there are, for example, new roads, new buildings, construction sites, road closures or similar substantial changes. Furthermore, the readjustment module 40 can be activated when substantial changes to parking rules and restrictions occur. In this module, all parameters of the system can be re-estimated. Furthermore, new modules or sub-modules can be run as part of the readjustment module 40. For example, new satellite images can require new processing sub-modules to extract the relevant data from them. The readjustment module 40 can also be activated if new and, preferably, better modules are developed, for example if a new sub-module for precise car detection is available. The readjustment module 40 allows to keep the whole algorithm up-to-date and update it as necessary, resulting in a robust and flexible prediction system. The readjustment module 40 can make use of all the relevant preceding modules in order to re-evaluate the output based on the new data 400. The output of the readjustment module 40 can be fed directly into the continuous time occupancy 20. Note, that new data 400 does not comprise parking event or people movement data, since those are more dynamic data sources that serve as inputs for the forecast occupancy module 30.

Figure 3:
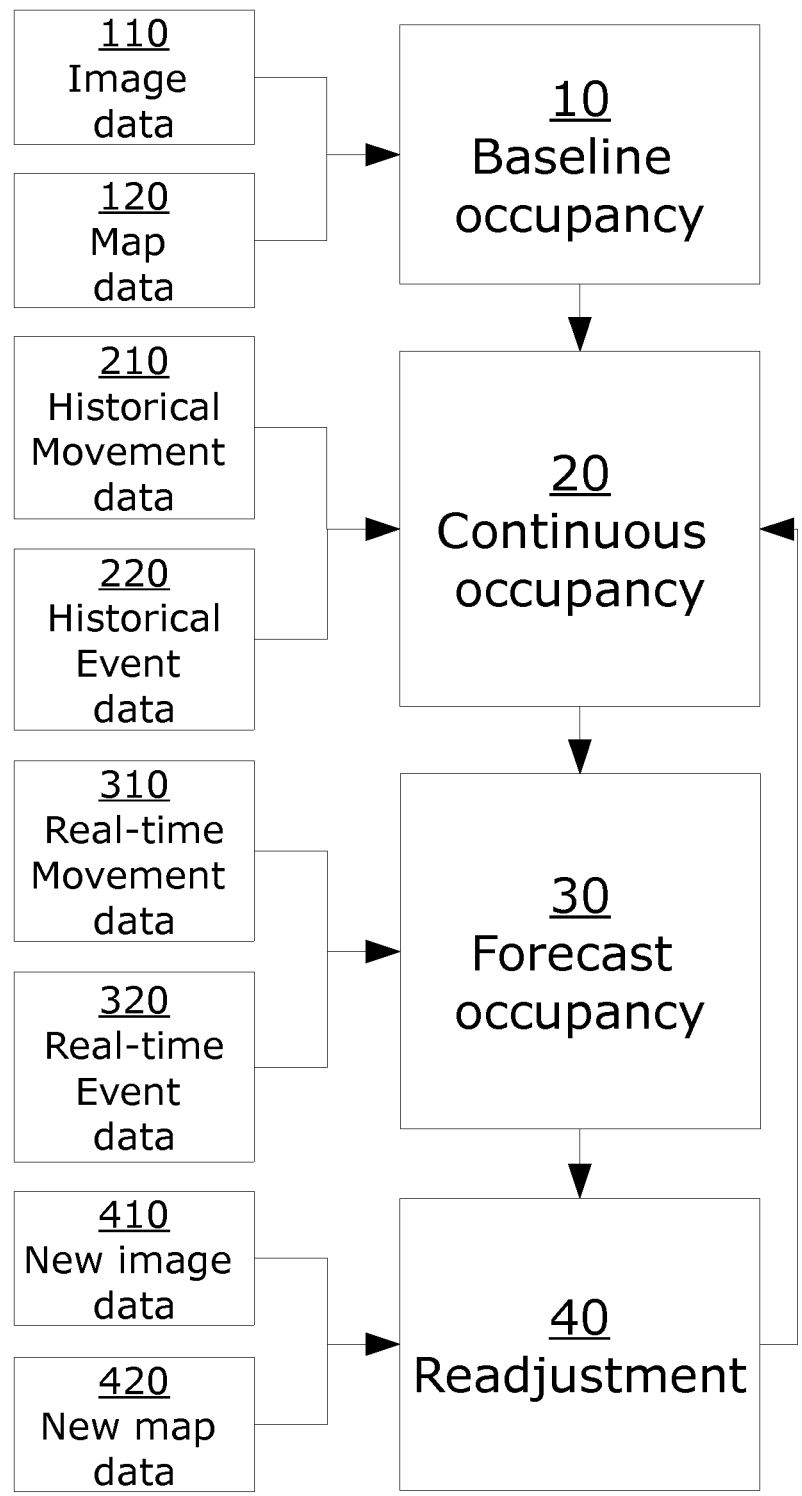
FIG. 3 depicts another schematic variation of a method for computing parking occupancy according to one aspect of the invention.

FIG. 3 schematically depicts a more detailed breakdown of the data inputs for each module of the parking occupancy method. As before, the inputs of the baseline occupancy 10 can comprise image data 110 and map data 120. These are discussed in more detail in the description relating to FIG.

1. The inputs of the continuous time occupancy module 20 can comprise historical movement data 210 and historical event data 220.

The historical movement data 210 can comprise movements of drivers/people in a city or in the street segment of interest. This data can comprise floating car data or floating cellular data that can be based on the mobile phones present in the area of interest. The phones can collect information regarding the time, the location, speed and acceleration of the vehicle, and potentially other relevant information. The historical movement data 210 can also comprise tracking data from navigation service providers, such as data from inbuilt car GPS devices or external GPS devices. The historical movement data 210 can also comprise network cell data. That is, the data regarding the number of mobile phones connected to a certain network point and their movement between the network points. In other words, the historical movement data 210 can comprise data that relates to the position of various mobile devices at a certain time of day in certain regions of interest. This data can come from mobile phones, inbuilt or external GPS devices, network providers or similar sources. Since this data does not discriminate between mobile device data from drivers and other people, it needs to be filtered to extract driver data only. This can be done based on additional information such as speed information for example. The speed information can also be extracted from a location data with timestamps. The historical movement data 210 can also comprise data from various traffic-monitoring sensors throughout a region of interest. For example, sensors counting the passing cars can be used.

The historical event data 220 can comprise data relating to parking events in a certain area of interest such as a street segment. Parking event can comprise for example events detected by a certain parking assistance component, such as an app for a mobile phone. Such a parking assistant can record park-in and park-out events of vehicles. The historical event data 220 can also comprise data from parking payment providers. This data can comprise park-in events and the length of parking permit validity. Such data can come, for example, from parking meters or various parking components such as apps that allow payment for street parking. The historical event data 220 can also comprise data from car sharing companies. Such companies often have vehicles parked throughout a certain region such as a city. They also have data regarding times when the vehicle is rented and when it is parked elsewhere in a region. For example, such companies include car2go or DriveNow. In other words, historical event data 220 can comprise data that relates specifically to parking events throughout the region of interest such as a street segment being analysed. The historical even data 220 can also comprise data from any sensors detecting parking events (such as sensors inbuilt into a road), and/or data originating from parking management systems. The data from parking management systems can comprise, for example, data obtained from parking meters. Some municipalities and areas can provide "connected" parking meters that collect data related to parking events.

The forecast occupancy module 30 can comprise real-time movement data 310 and real-time event data 320 as inputs. The real-time movement data 310 and the real-time event data 320 are analogous to the historical movement data 210 and the historical event data 220 respectively. The difference between the respective pairs is that the historical data is from the past, and the real-time data is from the present. The historical data can give a good enough estimate or an overall average parking availability overview that the continuous time occupancy 20 represents, but to obtain the upcoming parking availability given by the forecast occupancy 30, real-time data is needed. The forecast occupancy module 30 can also comprise a subroutine or a further module that is discussed in the description relating to FIG. 5.

The readjustment module 40 can comprise new image data 410 and new map data 420. The new image data 410 can comprise new satellite, aerial and/or ground-based images. The new map data 420 can be used when substantial changes to a map are known, such as during or after construction, after any urban area changes (e.g. new office buildings built), after any changes to parking rules and restrictions. The changes to parking rules can be obtained from new image or video data, from updated databases or from other documents.

Figure 4:
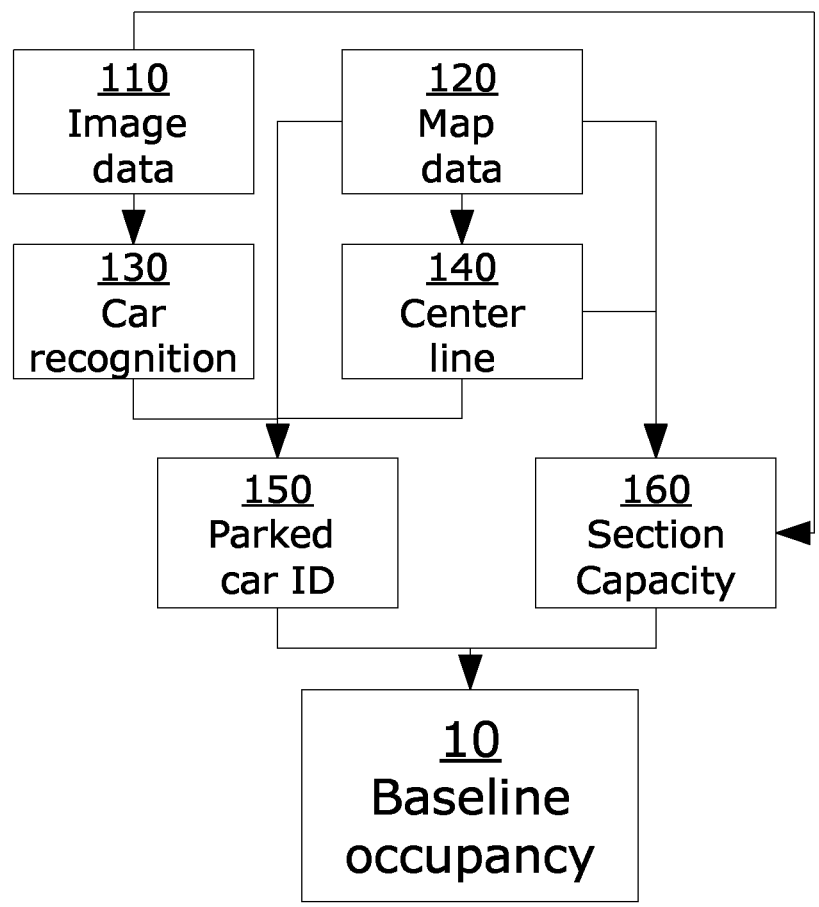
FIG. 4 depicts a subroutine of a method for computing parking occupancy relating to computing baseline occupancy.

FIG. 4 schematically depicts in a more detailed way how the baseline occupancy 10 is obtained. As before, the original inputs are image data 110 and map data 120. Those are described in detail in the description relating to FIG. 1.

The image data 110 can be used as an input for a car recognition module 130. The car recognition module 130 can comprise a sub-routine of the baseline occupancy 10 computation. The car recognition module 130 can use image recognition frameworks and machine learning algorithms such as the deep learning technique. The input image can be analysed with those techniques to detect different objects such as cars. The recognized objects can then be classified using deep neural networks. The output of the car recognition module 130 can comprise a collection of features such as polygons in a GeoJSON format. Each car can be represented as a polygon in such an output, preferably with additional attributes such as car orientation, car center point and/or other attributes.

The map data 120 can be used as an input for a center line module 140. The center line module 140 can comprise a sub-routine of the baseline occupancy 10 computation. The center line module 140 can for example locate the middle of each street or street segment based on the map data 120. The output of the center line module 140 can comprise georeferenced oriented lines of a center of a street, width of a street, or other attributes of a street.

The car recognition module 130 and the center line module 140 can be used as inputs for a parked car identification module 150. Furthermore, additional map data 120 can be used as an input for the parked car identification module 150. This additional map data 120 can originate from, for example, Open Street Map (OSM), Open Government Data (OGD), private companies or other sources. The additional map data 120 can also be used to detect street sections that might be covered or obscured by trees, have shadows on them or can otherwise lead to false negative car detections. For example, one side of a street can be entirely or partially obscured by trees or buildings, while the other side is unobscured. In this case, as part of the parked car identification module 150, the number of parked cars on the visible side of the street can extrapolated onto the other side of the street to compensate for the cars obscured by the trees or by buildings.

The parked car identification module 150 can detect cars that are parked as opposed to the moving cars present in image data 110 and therefore in the output of the car recognition module 130. The parked car identification module 150 can also detect and filter out cars that are parked on private properties, patios or in gardens, cars that are parked on private parking lots such as the ones in supermarkets, shopping centers, or rooftop parking lots, or other cars that may not be relevant to the baseline occupancy 10 computation. The parked car identification module 150 can further correct errors of georeferenced between the car recognition module 130 and map data 120. That is, parked cars are likely to be parked on the edge of streets or partially on the pavement. However, due to sensor errors or statistical errors, such cars may be shown as in the middle of the street when the car recognition module 130 is combined with the map data 120 and/or with the center line module 140. These mismatches can be detected by the algorithm and corrected accordingly.

The parked car identification module 150 can use a combination of Geographic Information System (GIS) and spatial statistical techniques to output a number of features in the GeoJSON format. That is, the parked car identification module 130 can map cars to a street by identifying the closest center line to each car, map cars to traffic lines on a street depending on their distance to a center line of that street, and assign to each car a probability that it is parked. The probability of parking can be computed using multiple different approaches, such as prior expert knowledge (for example estimates of parked vs driving cars in a city collected by official sources) or the use of multiple images.

Compared to the output of the car recognition module 130, the output of the parked car identification module 150 also comprises an additional attribute representing the probability that the car is parked.

The street center line module 140, as well as additional image data 110 and map data 120 can be used as inputs for section capacity module 160. The section capacity module 160 comprises information regarding how many cars can generally park on a given street segment. The size of each section can be divided by a standardized average size of a car. Additionally or alternatively, the module can use a distribution of various car lengths and subsequently compute a distribution as a result as well. Furthermore, the orientation of parked cars is taken into account. This can be done either by extracting the information regarding parking orientation from map data 120, or by extracting this information from the image data 110. In the latter case, a plurality of images taken at different times can be used to determine which side of a street cars typically park on. The output of the section capacity module 160 comprises a number of cars that can be parked on a given section with lower and upper bounds due to potential error accumulation.

The parked car identification module 150 and the section capacity module 160 can be used as inputs for the baseline occupancy module 10. The output of the baseline occupancy module 10 can comprise a percentage of free spots in a section and an error rate of the estimate with its distribution.

Figure 5:
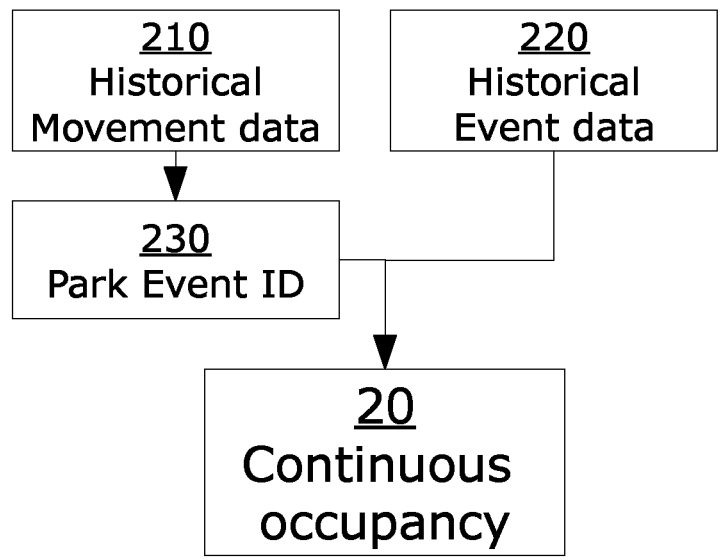
FIG. 5 depicts a subroutine of a method for computing parking occupancy relating to computing continuous time occupancy.

FIG. 5 schematically depicts in a more detailed way how continuous time occupancy module 20 is computed. As shown before in FIG. 3, the continuous time occupancy module 20 has the historical movement data 210 and the historical event data 220 as inputs. However, the historical movement data 210 can also be processed before serving as an input to the continuous time occupancy module. That is, the historical movement data 210 can serve as an input to a park event identification module 230. The park event identification module 230 serves to extract the information regarding parking events from the data relating to people movement. During the stage, the park event identification module 230 can also filter out data coming from users that do not use a car. Again, this can be done based on inferred or submitted speed of movement. The park event identification module 230 can use machine learning techniques and/or change-point estimation in user speed distribution (that can be obtained from GNNS sensors such as a GPS or Galileo, accelerometers or similar sensors) to recognize that a certain pattern of movement corresponds to a park-in or park-out event. For example, when using data from mobile phones as the historical movement data 210 input, the park event identification module 230 can recognize that a certain pattern of movement detected by the accelerometer and speed sensors corresponds to a park-in or park-out event. As another example, when using data from navigation services providers as the historical movement data 210 input, the park event identification module 230 can detect when the destination has been reached and deduce that a park-in event occurred. The output of the park event identification module 230 can comprise a series of entries, such as a table, relating to park-in and park-out events.

The output of the park event identification module 230, as well as parking events obtained from the historical event data 220 (described in detail in the description to FIG. 3) can then be used as inputs for the continuous time occupancy module 20. The continuous time occupancy module 20 then uses several variables or parameters to compute a model that provides parking availability for a given street segment at a given time. The variables can comprise the location and vicinity characteristics, the time and date characteristics, and/or the number of parking events in recent history. The location and vicinity characteristics can comprise data on the type of urban area (for example, residential vs office building vs factory areas), the proximity to specific places with large number of visitors (such as sport stadiums, zoos, concert halls, museums, churches, airports and similar venues), the proximity to the closest large public transport stop (such as an underground station, a railway station, a bus terminal), and/or the parking rules and restrictions in a given area. The time and date characteristics can comprise properties such as "working day", "weekend", "bank holiday" and/or "public holiday". The number of parking events in recent history can preferably comprise the difference between the number of park-out events and park-in events. The parking rules can be obtained from various sources such as databases, video or image data from smartphones or dashboard cameras, official sources and/or be obtained by other means.

The result or output of the continuous time occupancy module 20 can be presented as a heatmap, another graph, values of a selected quantile of current occupancy, predefined occupancy categories or in other ways. That is, the result can be delivered to a user in a graphical or numerical representation, for example via a mobile phone app. The results can also be shared with other partners and/or navigation service providers using an Application Programming Interface (API). For example, the navigation service provides could use the output of the continuous time occupancy module 20 to suggest to the best way to their users. The best way can also include the probability of finding a parking spot in a short time and located nearby.

Figure 6:
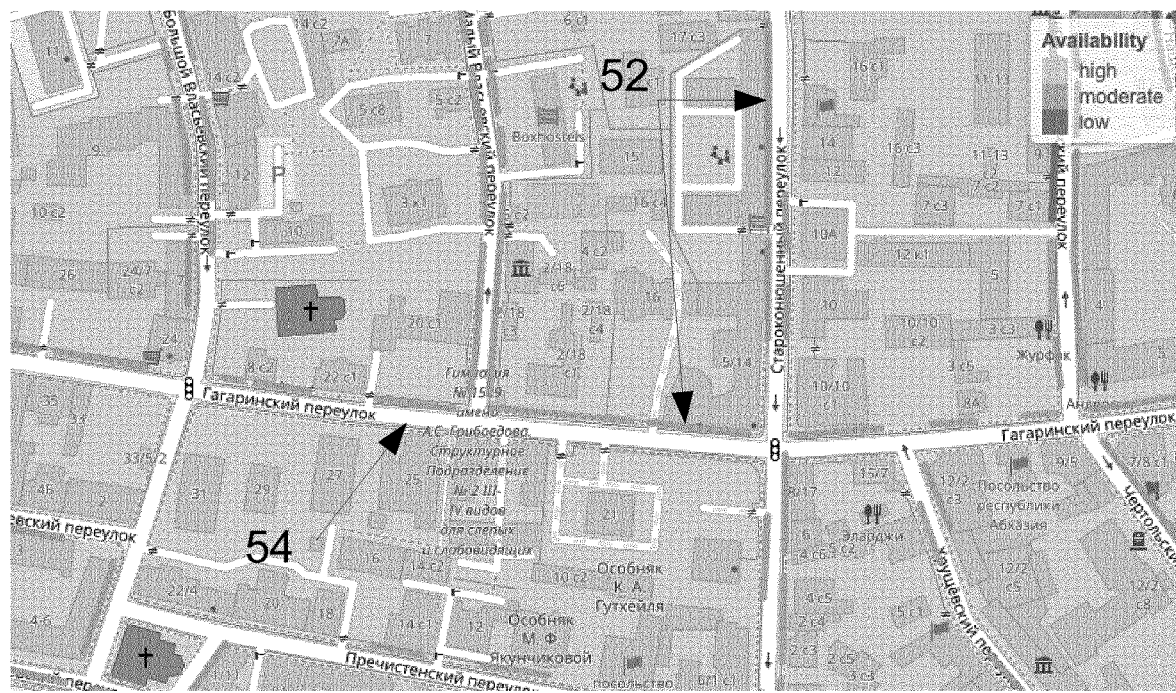
FIG. 6 depicts an embodiment of the parking occupancy output based on predefined occupancy categories.

FIG. 6 depicts one option of the parking occupancy computation output. Note, that the present figure can comprise the output of the continuous occupancy module and/or the output of the forecast occupancy module depending on the historical and real-time data available. In the depicted embodiment, the parking availability is shown as predefined categories "high", "moderate" and "low". That is, the category "high" corresponds to a large availability of parking spaces (that is, low occupancy), and the category "low" corresponds to a low availability of parking spaces (that is, high occupancy). This kind of output can be, for example, shown to a user of a mobile device as a response to a prompt for parking availability in a certain area.

The street segment depicted in FIG. 6 has mostly moderate parking availability as indicated by the colour code. Parking availability 52 denotes that parking spaces are generally available where indicated by the colour scheme. White areas 54 are regions where either no parking information is known or regions where parking is not permitted.

Figure 7:
FIG. 7 depicts an embodiment of the parking occupancy output based on occupancy quantiles.

FIG. 7 depicts another possible output of the parking occupancy computation. In FIG. 7, parking availability is indicated by the quantiles shown. A 0% availability corresponds to no free parking spaces (as indicated by the red colour), and a 100% availability corresponds to all parking spaces available (as indicated by the green colour). A colour code is also used for a more intuitive experience for the user. In the depicted embodiment, colored areas correspond to parking availability 52, and blank or uncolored areas correspond to regions where no information on parking is available and/or regions where parking is not permitted.

Figure 8:
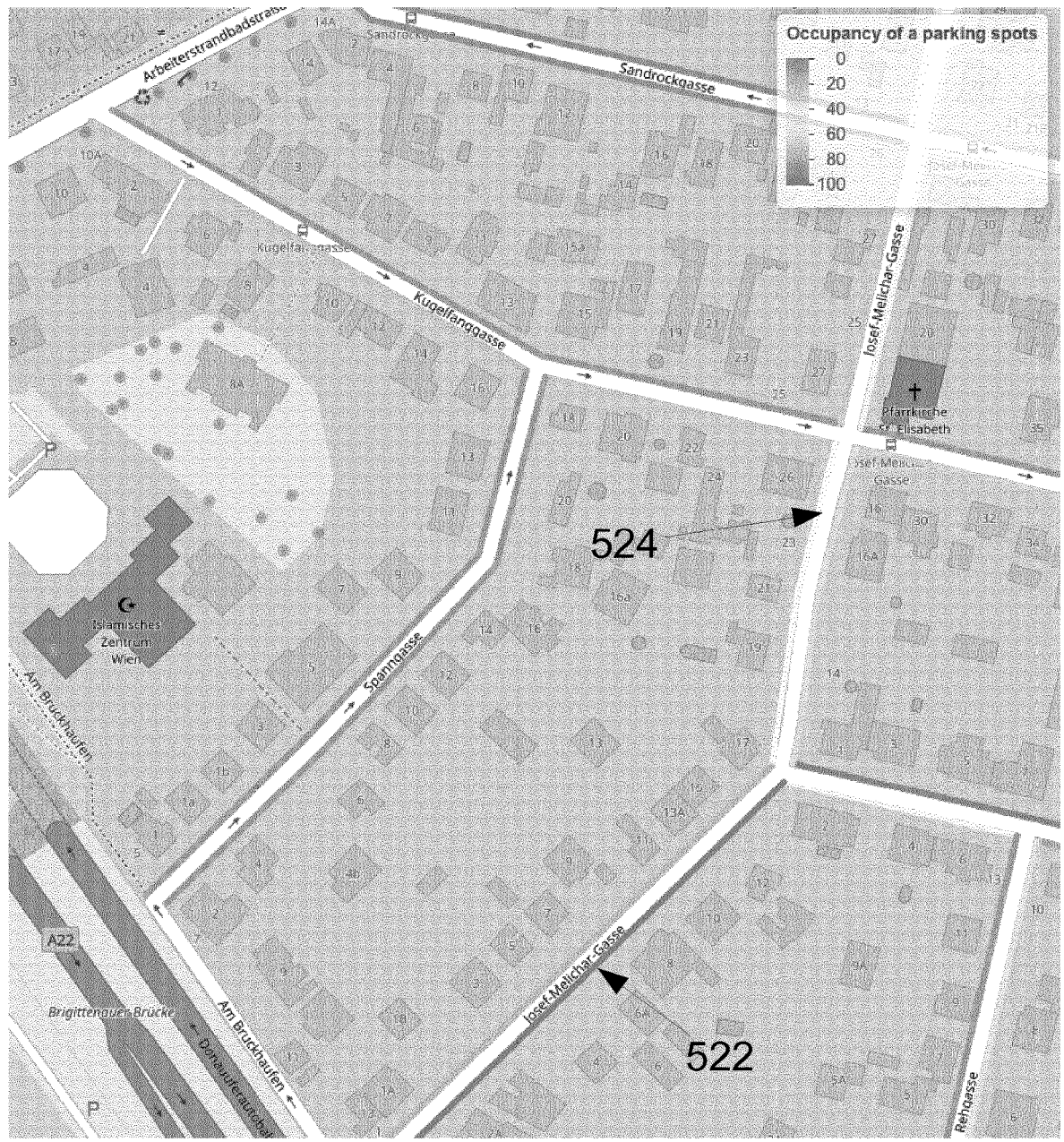
FIG. 8 depicts another embodiment of the parking occupancy output based on occupancy quantiles.

FIG. 8 depicts another possible output of the parking occupancy computation. Like in FIG. 7, the output is given by quantiles or percentages. However, in contrast to FIG. 7, parking occupancy and not parking availability is shown. That is, a 0% occupancy corresponds to no parking spaces occupied (as indicated by the green colour), and a 100% occupancy corresponds to all parking spaces occupied (as indicated by the red colour). FIG. 8 also presents a more diverse parking occupancy distribution. High parking occupancy 522 is indicated by the deep red colour and corresponds to almost no free parking spaces. Conversely, moderate parking occupancy 524 is indicated by the light yellow colour, and corresponds to approximately 30-50% of parking spots occupied. A user looking at the output similar to FIG. 8 might decide to look for parking in the areas with the more yellow or green colour, and therefore a lower parking occupancy. In this way, they may save time otherwise spent looking for parking.

Figure 9:
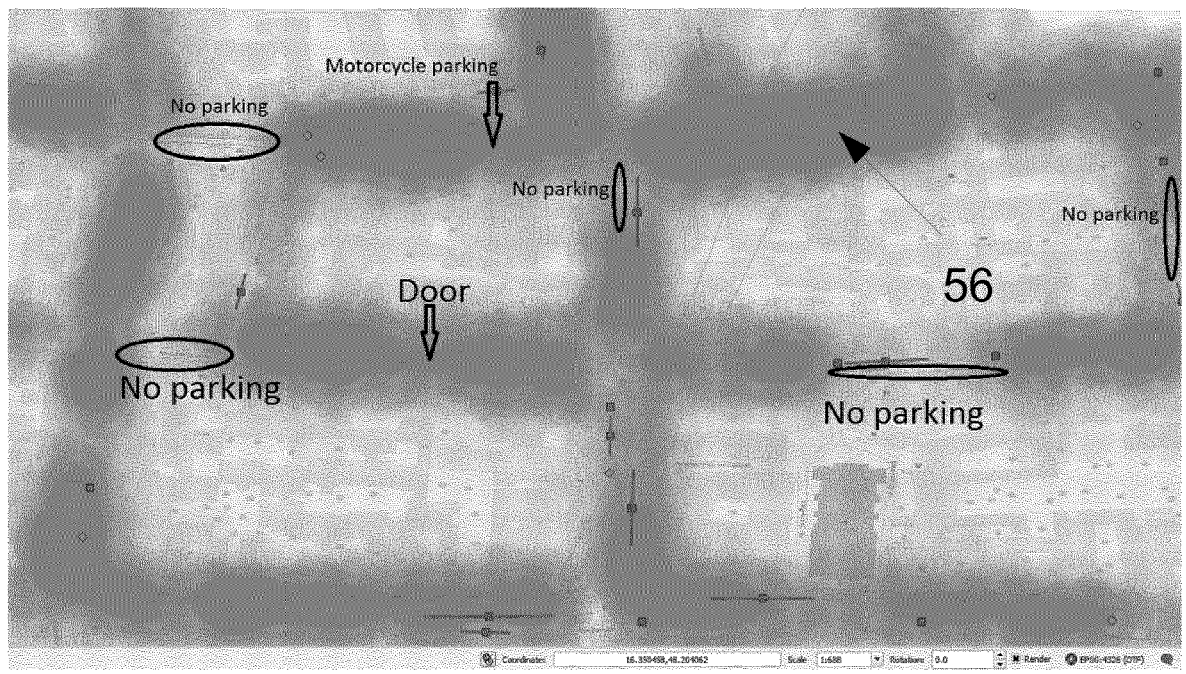
FIG. 9 depicts an intermediate output of the present invention schematically indicating the potential parking spots present in the depicted area.

FIG. 9 depicts an intermediate output of the parking occupancy computation. Parking spaces 56 present in a certain area or street segment are depicted in blue. Also indicated are areas where no parking is possible, or areas where parking for a smaller vehicle such as a motorcycle is possible. This intermediate output can be computed as part of the baseline occupancy module or as part of pre-formatting of the map data and image data. It shows a sort of template of all possible parking spaces onto which the parked cars can be mapped based on the time, day, parking rules and/or other factors.

Figure 10:
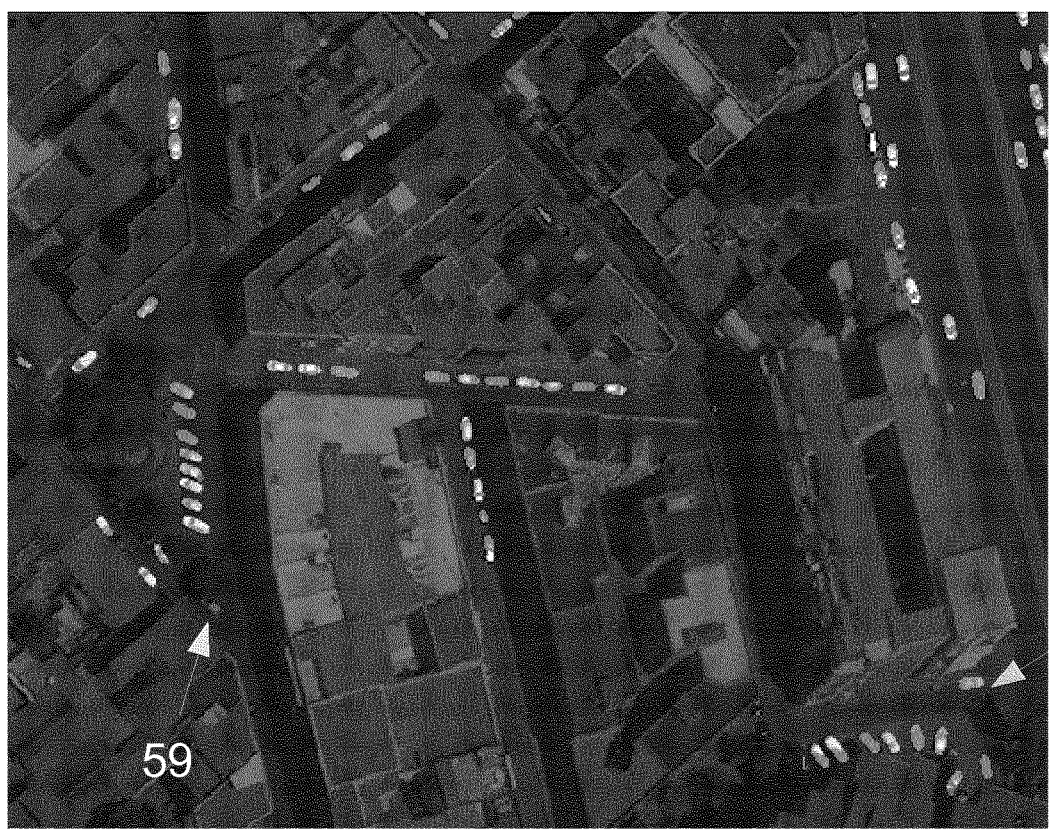
FIG. 10 depicts an intermediate output of the present invention indicating the vehicles detected in a satellite image.

FIG. 10 schematically depicts another intermediate output of the parking occupancy computation. An exemplary satellite photo is shown with detected cars 58 indicated in white. FIG. 10 can be, for example, an output of the car recognition submodule running as part of the baseline occupancy module computation. As discussed above, some cars may not get detected if they are obstructed by other objects or standing in shadow. For example, undetected car 59 is shown in FIG. 10. Various statistical methods can be used to obtain a robust parking occupancy result despite the possible errors in car detection such as undetected cars 59.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for computing street parking occupancy for a street segment, comprising
running a baseline occupancy module for the street segment using at least map data and image data to compute a baseline occupancy;
running a continuous time occupancy module for the street segment using at least the baseline occupancy and historical data to compute a continuous time occupancy; and
running a forecast occupancy module for the street segment using the continuous time occupancy module and at least real-time data to compute a forecast occupancy,
wherein the baseline occupancy model comprises a car recognition module that outputs a plurality of georeferenced features corresponding to cars detected in the image data, and
wherein the baseline occupancy module further comprises a center line module, wherein the center line module outputs at least georeferenced oriented features corresponding to a middle of the street segment.

2. The method according to claim 1, wherein the baseline occupancy module further comprises a parked car identification module that uses the outputs of the car recognition module and the center line module to compute a plurality of georeferenced features corresponding to cars and wherein each feature corresponding to a car further comprises a probability that the car is parked, and wherein the parked car identification module filters out at least one of:
cars that are moving;
cars that are parked on private property; and
cars that are parked on private parking lots.

3. The method according to claim 2, wherein the baseline occupancy module computes a section capacity value comprising at least a number of cars that can park in the street segment with lower and upper bounds of said number of cars that can park in the street segment.

4. The method according to claim 3, wherein the street parking occupancy for the street segment obtained by the forecast occupancy module is displayed with a map by the mobile device.

5. The method according to claim 1, wherein the historical data comprises at least one of:
historical movement data, comprising at least one of:
floating car data;
tracking data from navigation service providers; and
mobile network data; and
historical event data, comprising at least one of:
parking assistance application data;
parking payment provider data;
parking management system data; and
car sharing company data.

6. The method according to claim 1, wherein the continuous time occupancy module comprises a parking event identification module that outputs a plurality of park-in and park-out events on the street segment based on the historical data.

7. The method according to claim 1, wherein the continuous time occupancy module outputs a model that provides a measure of parking availability for the street segment and a time.

8. The method according to claim 7, wherein the continuous time occupancy module takes into account variable types including at least one of:
location and vicinity characteristics;
time and date; and
number of parking events in the recent history.

9. The method according to claim 7, wherein the continuous time occupancy module computes an output using at least one of:
statistical filtering methods; and
spatial point processes.

10. The method according to claim 1, wherein the forecast occupancy module outputs a predicted availability of parking spaces in the street segment at a future time.

11. The method according to claim 1, further comprising running a readjustment module using at least new data to provide an output, and wherein the output of the readjustment module is used as a further input into the continuous time occupancy module.

12. A system that computes street parking occupancy of a street segment, comprising:
a server, comprising:
a memory component storing instructions and configured to store at least image data, map data and historical data; and
a processing component configured to execute the instructions to at least:
run a baseline occupancy module for the street segment using at least the map data and the image data to compute a baseline occupancy;
run a continuous time occupancy module for the street segment using at least the baseline occupancy and the historical data to compute a continuous time occupancy; and
run a forecast occupancy module for the street segment using at least the continuous time occupancy and real-time data to compute a forecast occupancy,
wherein the baseline occupancy module outputs at least an estimate of a percentage of available parking spots for the street segment and an error rate of the estimate.

13. The system according to claim 12, wherein the server is configured to communicate the forecast occupancy with one or more mobile devices in response to a request for the street parking occupancy of the street segment.

14. The system according to claim 13, wherein the server is configured to send updates to the mobile device when the forecast occupancy changes.

15. The system according to claim 13, wherein the mobile device is configured to send the server data relating to parking events, wherein the server is configured to process the data sent by the mobile device and to incorporate the data into at least one of
the historical data; and
the real-time data, and
wherein the server is configured to re-compute at least one of the continuous time occupancy module and the forecast occupancy module based on the data sent by the mobile device.

16. The system according to claim 13, wherein the mobile device further comprises a graphical display and wherein the server is configured to send a graphical representation of parking availability obtained by the forecast occupancy module to the graphical display.

17. The system according to claim 16, wherein the graphical representation comprises a heatmap.

18. A method for computing street parking occupancy for a street segment, comprising
running a baseline occupancy module for the street segment using at least map data and image data to compute a baseline occupancy;
running a continuous time occupancy module for the street segment using at least the baseline occupancy and historical data to compute a continuous time occupancy; and
running a forecast occupancy module for the street segment using the continuous time occupancy module and at least real-time data to compute a forecast occupancy;
wherein the baseline occupancy module outputs at least an estimate of a percentage of available parking spots for the street segment and an error rate of the estimate.

* * * * *